(12) United States Patent
Morris

(10) Patent No.: US 11,675,317 B2
(45) Date of Patent: Jun. 13, 2023

(54) INTERACTIVE AND CUSTOMIZABLE DEVICE USING MAGNETIC LEVITATION

(71) Applicant: FLYTE LLC, New York, NY (US)

(72) Inventor: Simon Morris, New York, NY (US)

(73) Assignee: FLYTE, LLC, New York, NY (US)

( * ) Notice: Subject to any disclaimer, the term of this patent is extended or adjusted under 35 U.S.C. 154(b) by 615 days.

(21) Appl. No.: 16/462,907

(22) PCT Filed: Nov. 21, 2017

(86) PCT No.: PCT/US2017/062831
§ 371 (c)(1),
(2) Date: May 21, 2019

(87) PCT Pub. No.: WO2018/094401
PCT Pub. Date: May 24, 2018

(65) Prior Publication Data
US 2019/0310588 A1 Oct. 10, 2019

Related U.S. Application Data

(63) Continuation of application No. 15/607,623, filed on May 29, 2017, now abandoned.

(60) Provisional application No. 62/457,667, filed on Feb. 10, 2017, provisional application No. 62/424,932, filed on Nov. 21, 2016.

(51) Int. Cl.
*G04G 9/00* (2006.01)
*G04F 10/10* (2006.01)
*G04C 17/00* (2006.01)
*G04G 17/00* (2013.01)
*H02N 15/00* (2006.01)
*G04G 21/04* (2013.01)

(52) U.S. Cl.
CPC ........... *G04F 10/105* (2013.01); *G04C 17/00* (2013.01); *G04G 9/00* (2013.01); *G04G 17/00* (2013.01); *H02N 15/00* (2013.01); *G04G 21/04* (2013.01)

(58) Field of Classification Search
CPC ........ G04C 17/00; G04F 10/105; G04G 9/00; G04G 21/04; G04G 17/00; H02N 15/00
See application file for complete search history.

(56) References Cited

U.S. PATENT DOCUMENTS

| | | | | |
|---|---|---|---|---|
| 5,272,681 A * | 12/1993 | Lee | ...................... | G04B 45/046 368/223 |
| 5,638,340 A * | 6/1997 | Schiefele | ........... | G04B 45/0053 40/485 |
| 5,943,298 A * | 8/1999 | Goldson | .............. | G04B 47/003 368/27 |
| 6,388,953 B1 * | 5/2002 | Wu | ...................... | G04B 45/0038 368/223 |
| 2017/0176952 A1 * | 6/2017 | Misaki | ................. | G04G 9/0076 |

* cited by examiner

*Primary Examiner* — Sean Kayes
(74) *Attorney, Agent, or Firm* — Greenberg Traurig LLP; Nigamnarayan Acharya

(57) ABSTRACT

A magnetic levitation device for levitating a marker or suspending the marker away from the device having a housing having an outer portion and a lower portion. The device has an electromagnetic configuration positioned on disc and the disc can move or rotate the marker at a constant or variable speed. The rotating disc is configured with the electromagnetic configuration and a gear assembly.

12 Claims, 16 Drawing Sheets

INTERACTIVE AND CUSTOMIZABLE DEVICE USING MAGNETIC LEVITATION

CROSS REFERENCE TO RELATED APPLICATIONS

This application is a national phase application of International Application No. PCT/US17/62831, filed Nov. 21, 2017, which claims the benefit of priority of U.S. Provisional Patent Application No. 62/424,932, filed Nov. 21, 2016, U.S. Provisional Patent Application No. 62/457,667, filed on Feb. 10, 2017, and U.S. patent application Ser. No. 15/607,623, filed May 29, 2017, all of which are incorporated by reference herein in their entirety.

TECHNICAL FIELD

This application relates generally to an interactive and customizable device that has a magnetic levitation mechanism, and more particularly to clocks and visual aids for use with time management, goal management, and scheduling.

BACKGROUND

Magnetic levitation devices selectively oscillate or modulate a levitating force to float or levitate a displayed object or to animate an object and have been available for many years. Manipulating magnetic fields and controlling their forces to levitate an object is disclosed in many references. Such references include mechanisms for magnetically levitating an object, as well as controlling the spatial position of such a magnetically levitated object. Magnetic levitation devices typically have an object with a permanent magnet or at least a ferrous object embedded within it or on an outer surface positioned under the electromagnet. Some of the references of magnetic levitation systems are shown in U.S. Pat. Nos. 6,595,041, 6,035,703, 5,980,193, 5,319,670, 5,168,183, 4,585,282, and 4,191,951, all of which are incorporated by reference.

A magnetically levitated object can be suspended above a base by magnetic fields. An electromagnetic force is used to counteract the effects of gravity. The forces acting on an object in any combination of gravitational, electrostatic, and magnetostatic fields will make the object's position unstable. The reason a permanent magnet suspended above another magnet is unstable is because the levitated magnet will easily overturn and the force will become attractive (Earnshaw's Theorem).

Magnetic levitation techniques have been used with railways, mechanical equipment, floating globes, etc. Magnetic levitation technology has been incorporated into the designs of intelligent home appliances, such as a table lamp. U.S. Pat. Nos. 5,638,340 and 5,159,583 disclose clocks employing magnetically levitated mechanisms.

Accordingly, there is always a need for improved timing devices and other novelty devices. There is also a need for a customizable and interactive device that can provide, among other things, time management, scheduled events reminders, goal management, and scheduling assistance. It is to these needs, among others, that this application is directed.

SUMMARY

This application provides an interactive and customizable magnetic levitation device or a magnetic levitation timing device for, among other things, managing time, goal management, scheduling an event and remembering the scheduled events. The timing device visually reveals the time or period during which a predetermined event is scheduled to occur.

One embodiment includes a magnetic levitation timing device for levitating a marker or suspending the marker away from the device having a housing, an electromagnetic configuration, a driving configuration that can move or rotate the marker at a constant or variable speed on, about or around the outer portion of the housing; a rotating disc configured with the electromagnetic configuration; and a gear assembly configured to move or rotate the electromagnetic configuration. The magnetic levitation timing device can have a timing mechanism, an electromagnetic force driving configuration, indicia (that may be on the housing of the device) and a marker on or above the housing. The outer portion of the housing can include indicia and can display information, e.g., about the timing elements. The housing may be configured to secure the device on a horizontal or non-horizontal surface (e.g., an angle greater than 10 degrees).

In another embodiment, the electromagnetic force from the magnet levitates or suspends the marker so that it may move or rotate at a constant or variable speed about or around the surface of the device. The marker may be a magnetic material or a permanent magnet. The marker may have various shapes including, e.g., a floating ball, cube, or other shape.

In another embodiment, the magnetic levitation timing device includes an interactive display. The device is further provided with indicia, including, but not limited to, goal markers or event indicia, the indicia can be removable or affixed to the upper surface or can be rearranged depending on the need or desire of the user. The indicia may be disposed in relation to the marker such that the marker signals during the scheduled time that the particular event is to occur.

In another embodiment, the magnetic levitation timing device comprises a housing that has an electromagnetic force driving configuration and a marker. The outer portion of the housing can have grooves or marks representing the indicia. The lower portion of the housing can be configured to secure the device to a mounting surface. Inside the housing, there can be a rotating disc configured with a rotating assembly and the electromagnetic configuration. The electromagnetic driving force configuration may include a magnet and coil array into a mounting plate assembled with the rotating disc. The marker is placed above the outer portion of the housing or over the rotating disc. The rotating assembly rotates the rotating disc and an electromagnetic force from the magnet levitates or suspends the marker, which may move or rotate at a constant or variable speed about or around the outer portion of the housing. In one embodiment, the rotating assembly includes a motor with a gear mounted on a gear arranged on the rotating disc.

In some embodiments, the marker can move along a linear, rather than circular path on the surface of the magnetic levitation timing device. In some embodiments, the marker may be luminescent. For example, a transmitting coil can transmit power to the marker, which may allow the marker to illuminate. The marker can illuminate around or along the upper surface.

In some embodiments, the magnetic levitation timing device can depict events over a nonstandard period of time. In other embodiment, the magnetic levitation timing device is desired to depict standard time, including, but not limited to, minutes, hours, seconds, days, etc.

In some embodiments, the magnetic levitation timing device may include non-magnetic or levitating features. For example, the magnetic levitation timing device may have a digital display or another feature that is not magnetically driven.

This application includes the use of an electromagnetic theory of the permanent magnet that moves a metallic object around or about the surface.

Other features and advantages of the present invention will become apparent from the following specification taken in conjunction with the enclosed drawings.

BRIEF DESCRIPTION OF THE DRAWINGS

The drawings and the associated descriptions are provided to illustrate embodiments disclosed in this application.

DETAILED DESCRIPTION

Specific embodiments include a magnetic levitation or an electromagnetic timing device that includes a timing mechanism, a magnetic marker operatively connected to the timing mechanism, and indicia (e.g., a goal marker). As used herein, the term "levitated" or "levitation" includes an object held aloft or suspended away from (e.g., horizontal and angled) a device, without mechanical support, in a stable position. That is, the magnetic levitation or the electromagnetic timing device can be mounted on surfaces that may not be horizontal and the device can operate accordingly such that the marker is suspended away from the device.

Figure 1:
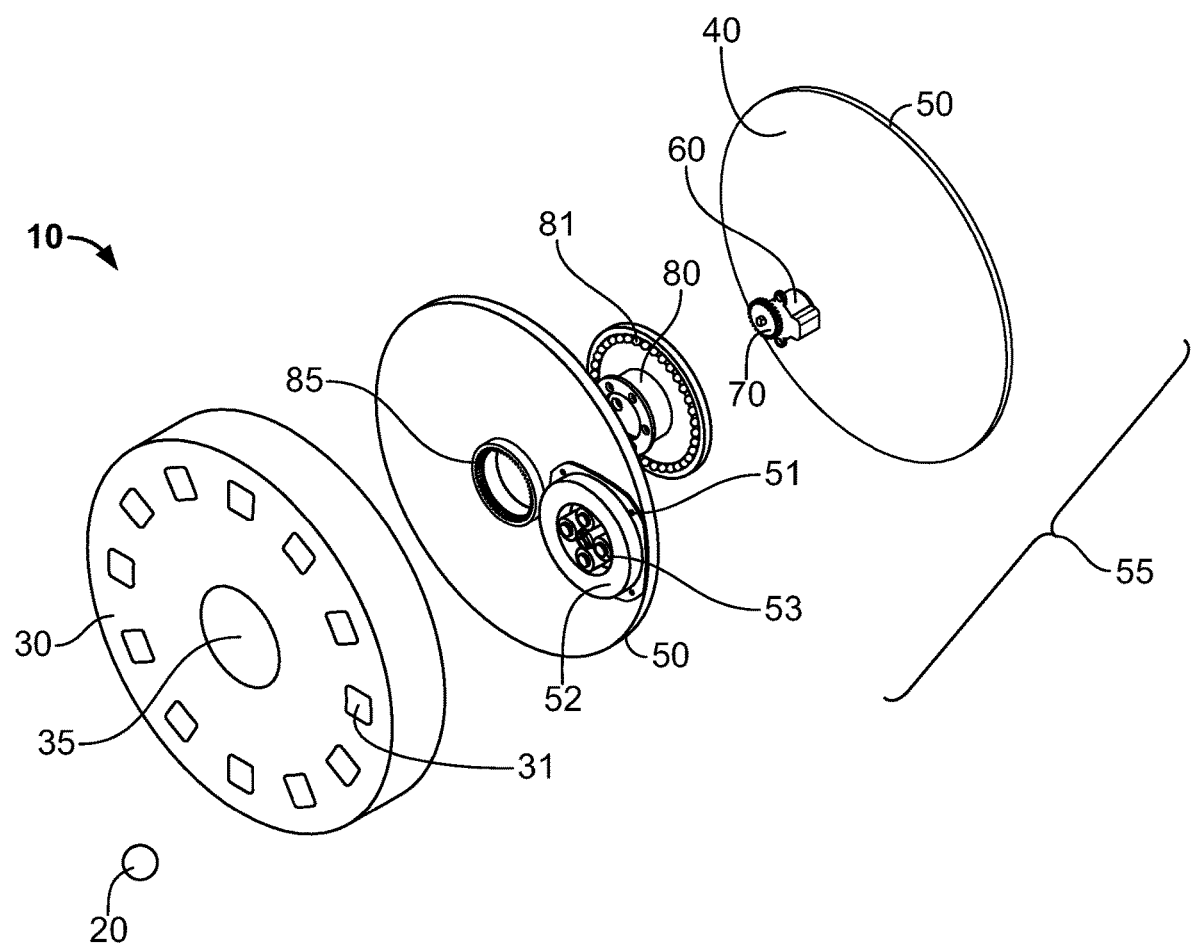
FIG. 1 shows an isometric exploded view of one specific embodiment of a magnetic levitation timing device.

Now referring to FIG. 1, one exemplary embodiment includes an electromagnetic timing device 10 for levitating or holding/suspending a marker 20 having a housing 30 that has an outer portion and a lower portion, a magnetic levitation or electromagnetic configuration, a rotating disc 50 that is configured with the electromagnetic configuration 55; and a gear assembly 70 that is configured to move the magnetic levitation configuration 55 within the housing 30. One specific example includes magnetic levitation timing device 10 that includes electromagnetic force driving or magnetic levitation configuration/electromagnetic configuration/levitation unit 55, a rotating disc 50, indicia 33 (optional) and a magnetic marker 20. The outer portion of the housing 30 may have a display 35 e.g., in the center, and the lower portion 40 of the housing configured to secure the device 10 on a mounting surface e.g., a wall. The rotating disc 50 is configured with a motor 60, gears 70, motor housing 80 and the electromagnetic configuration 55 that is operatively mounted through a mounting grove (not shown) on the rotating disc 50. The magnetic marker 20 can be a ball or other shape placed over the outer portion of the housing 30 or operatively connected to a timing mechanism/electromagnetic configuration 55. The marker 20 can be levitated, suspended or held away from device 10 by the electromagnetic driving force from the electromagnet 53. In one embodiment, the marker 20 is generally a metal or magnetic material.

In one embodiment, the electromagnetic driving force configuration 55 may include a magnet 52 and coil array 53. In this embodiment, the motor 60 with the gear 70 is configured to drive the rotating disc 50, which holds the electromagnetic configuration 55 that magnetically levitates or holds away the marker 20 on the outer portion of the housing 30. For mechanically driving the rotating disc 50, a gear 85 is operatively connected to a motor 60. The magnet 52 can be a permanent magnet. The magnet 52 can be integrated with the coil array 53 formed by electromagnetic coils or coil windings or copper windings. One or more stepper motors or servo motors can provide overall period of movement and thus the movement of the marker 20 and marker 20.

In one specific embodiment, the electromagnetic configuration 55 includes the coil array 50 mounted within the mounting plate 50 and operatively attached to the rotating disc 40 through magnetic mounting groove 12. In another embodiment, the coil array 53 is a copper sleeve wound on the magnet 52 to form an electromagnet. In this configuration, the electromagnetic configuration 55 is mounted on or rests upon rotating disc 50.

In another embodiment, the rotating disc 50 includes the motor 60 with a gear 70 and the motor housing 80 which are securely attached to form a drive mechanism and may have bearings 81. The outer portion of the housing 30, the rotating disc 50 and the back portion 40 can be assembled into a compact design that looks like a clock, which can be mounted or placed at an angle greater than, for example, 10 degrees, 20 degrees, 30 degrees, 40 degrees or at an angle between 1 and 90 degrees. The marker 20 may freely move through the magnetic levitation principle. The movement is realized through electromagnetic force generated from the electromagnetic configuration 55 in conjunction with the mechanical transmission by a motor or multiple motors. The motor may be configured to drive the rotating disc 50 and the electromagnetic configuration 55 levitates the marker 20 on upper side in, e.g., circular movements, around the housing 30.

The magnetic levitation timing device 10 may include an interactive display 35 and other operative mechanism such as on/off functions (not shown). Further, in one example, the magnetic levitation timing device 10 provides a visual aid for users to help with understanding the concept of time, the concept of passage of time, remembering scheduled events, or the concept of future timelines. The magnetic levitation timing device 10 may visually demonstrate the time during which at least one predetermined event is scheduled to occur. The magnetic levitation timing device can levitate or be hold away the marker 20 when mounted at, e.g., 90 degrees, as it can be hung on a vertical surface (e.g., a wall).

In one embodiment, the marker 20 is disposed in relation to indicia 31 such that the indicia 31 signals at a scheduled time corresponds to a particular event. In one example, the magnetic levitation timing device 10 is provided with numerous event indicia 31 that are removable or affixed to the outer portion 30 or can be rearranged depending on the need of the user. The marker 20 can be disposed in relation to indicia 31 such that indicia 31 provides a signal during the time the event is scheduled to occur or is desired to ultimately occur. Indicia 31 can visually symbolize (through pictures, words, or otherwise) a past, scheduled, or future event. Depending on the length of a scheduled event, a group of markers can represent a single event. Among other things, the shape of the magnetic levitation timing device 10, orientation and nature of the markers, method of signaling by the indicia 31, and type and speed of the timing mechanism employed are all variable for use with certain specific embodiments. As a metaphor, the magnetic levitation timing device 10 can tell a "story."

Figure 2A:
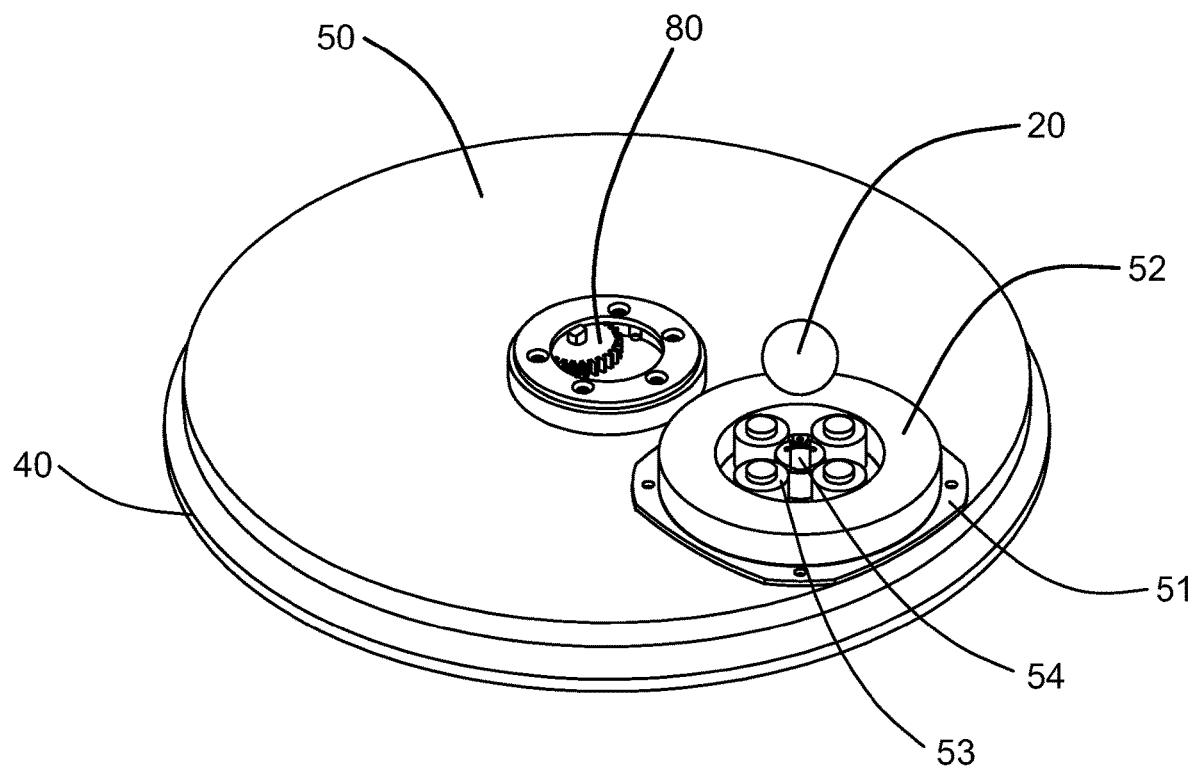
FIG. 2A shows an isometric view illustrating the inside of a magnetic levitation timing device shown in FIG. 1.
Figure 2B:
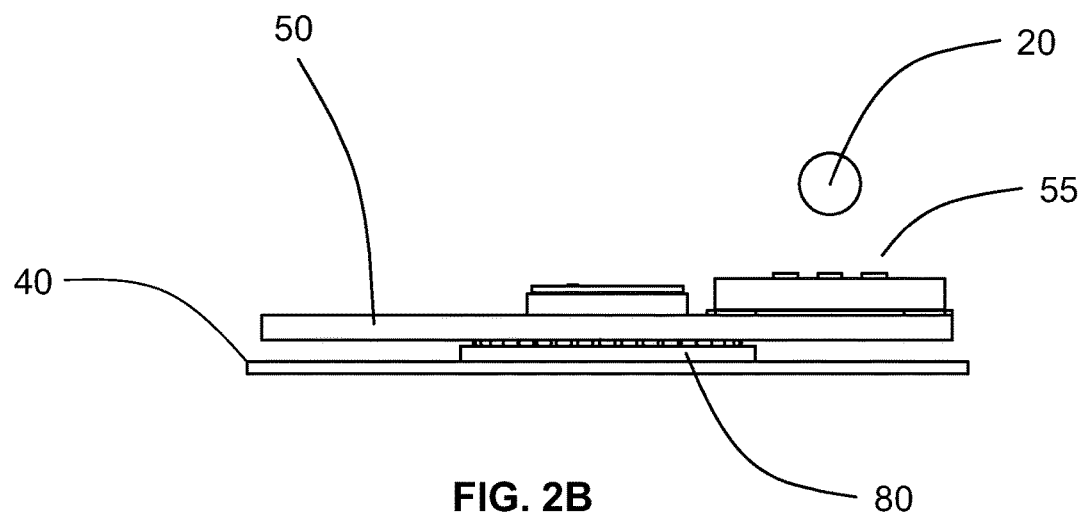
FIG. 2B shows an isometric side view illustrating the inside of a magnetic levitation timing device shown in FIG. 1.

FIGS. 2A, and 2B show examples of the magnetic levitation timing device 10, including the basics of an exemplary device. As can be seen, the magnetic marker 20 levitates, is suspended, or floats along, above or about the outer portion 30 of the device 10 over the electromagnetic configuration 55 on disc 50. As can be seen in the examples, the magnetic levitation timing device 10 can have an electromagnet 53, and permanent a magnet 52 or series of magnets, and a hall effect sensor 54. In one example, the magnetic marker 20 can have or can be a permanent magnet. The housing 30 in this example can be mounted over the electromagnetic configuration 55 or disc 50.

Figure 3A:
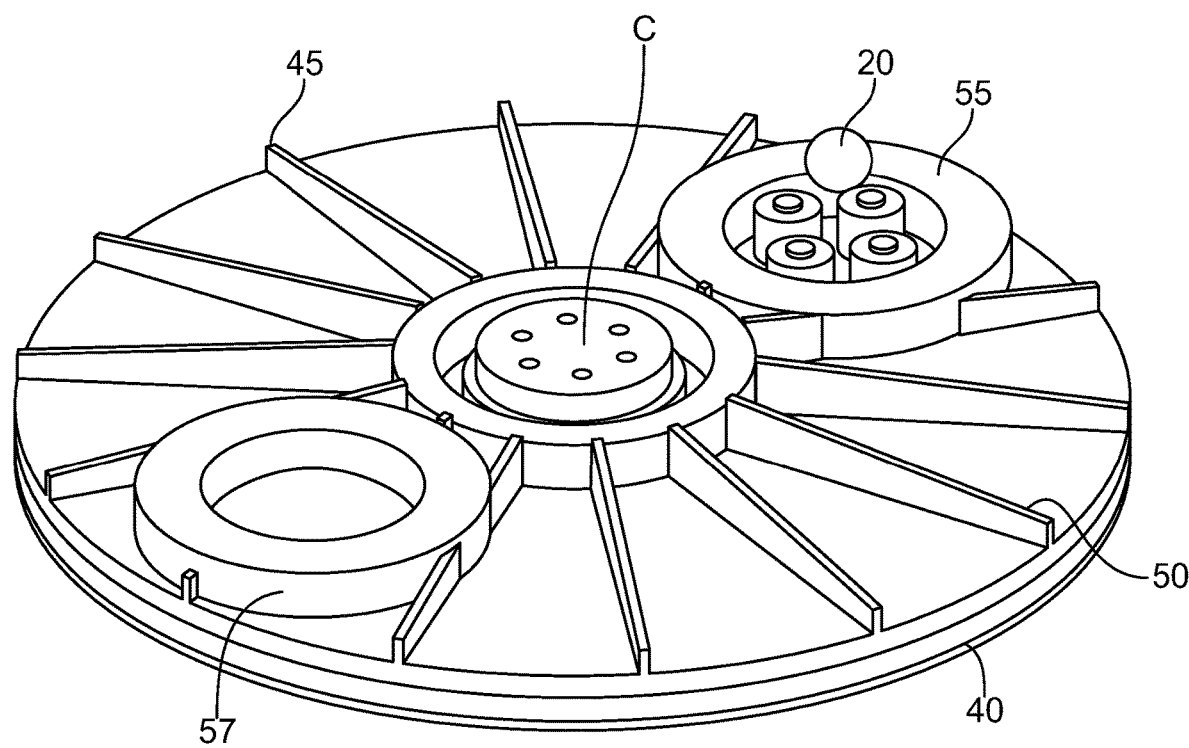
FIG. 3A is an inside top view of a magnetic levitation timing device in accordance with another embodiment.
Figure 3B:
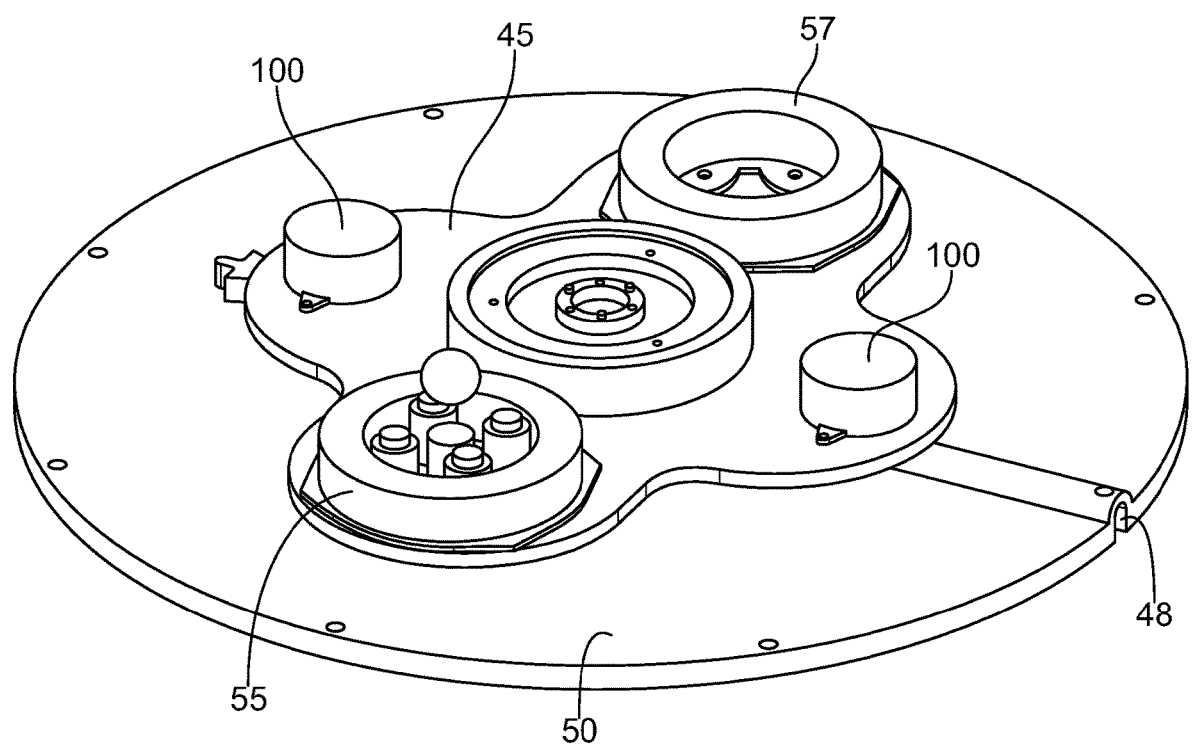
FIG. 3B is a perspective view of a magnetic levitation timing device in accordance with another embodiment.

FIGS. 4A, 4B, shows another example of the magnetic levitation timing device 10 showing a specific embodiment in the device 10 has an electromagnetic configuration 55 t operatively linked to the marker 20 and a counterweight 57 opposite side to or away from electromagnetic configuration 55. While the counterweight 57 is shown across from the electromagnetic configuration 55, it is feasible to place the counterweight 57 at various places on the disc 50. In this arrangement, there can be a planetary gear in one example that are covered by cover C. Further, the magnetic levitation timing device 10 can have supporting and strengthening features 45 over on the disc 50, which is powered by motors 100 (covered). FIG. 3A shows that the electromagnetic configuration 55 can rest on the disc 50 and is powered by a motor (not shown). In this example, there may also be an optional wire groove 48 to hold the wire that may power the motor that drives the gear assembly. Techniques to maintain the position of the wire and to keep the wires from twisting are known in the art.

While the magnetic levitation timing device 10 can have traditional levitation systems and features, FIG. 4B shows a specific embodiment in which the magnetic configuration 55 is operatively linked to the marker 20 and has a counterweight 57 opposite to or away from it. As shown in FIGS. 3A and 43B, there can be a counterweight 57 (opposite the levitation marker 20 or levitation object) which stabilizes the rotation of the levitation system and allows a "smoother" rotation of the levitation unit at, e.g., 90 degrees or other angle. The counterweight 57 can be adapted to move in opposition to the marker 20 to cancel the accelerating forces in the vertical position. In other embodiments, there may be more than one counterweight 57 placed at positions other than opposite the electromagnetic configuration 55.

Figure 4:
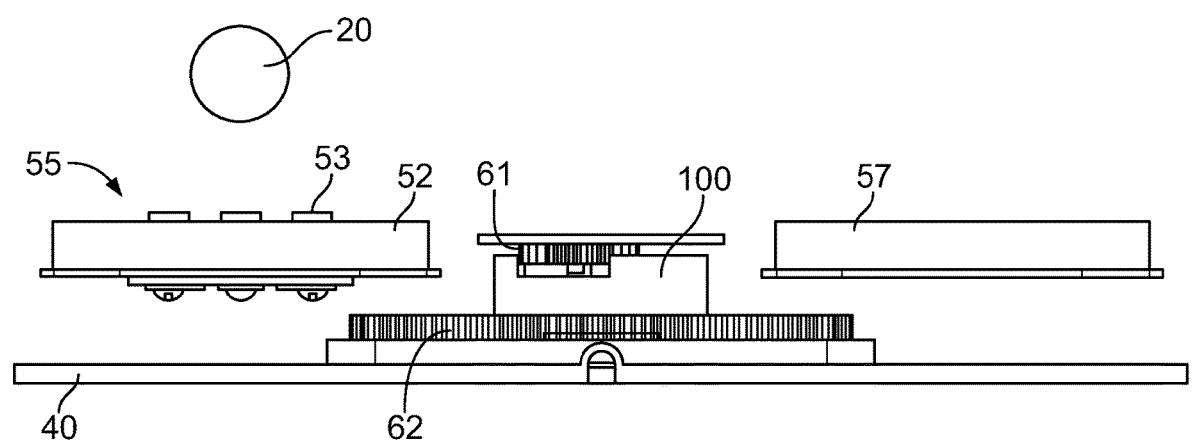
FIG. 4 is a side view of a magnetic levitation timing device in accordance with the embodiment shown in FIG. 4B.

FIG. 4 shows a side view of the embodiment show in FIG. 4A. There can be two sets of gears 61, 62, which are powered by one or more motors 100. The use of multiple motors may result in smoother motion of the disc 40. The electromagnetic configuration 55 and counterweight 57 are shown for illustration with respect to the gear system and would rest on disc 50, which is not shown in FIG. 4.

Figure 5A:
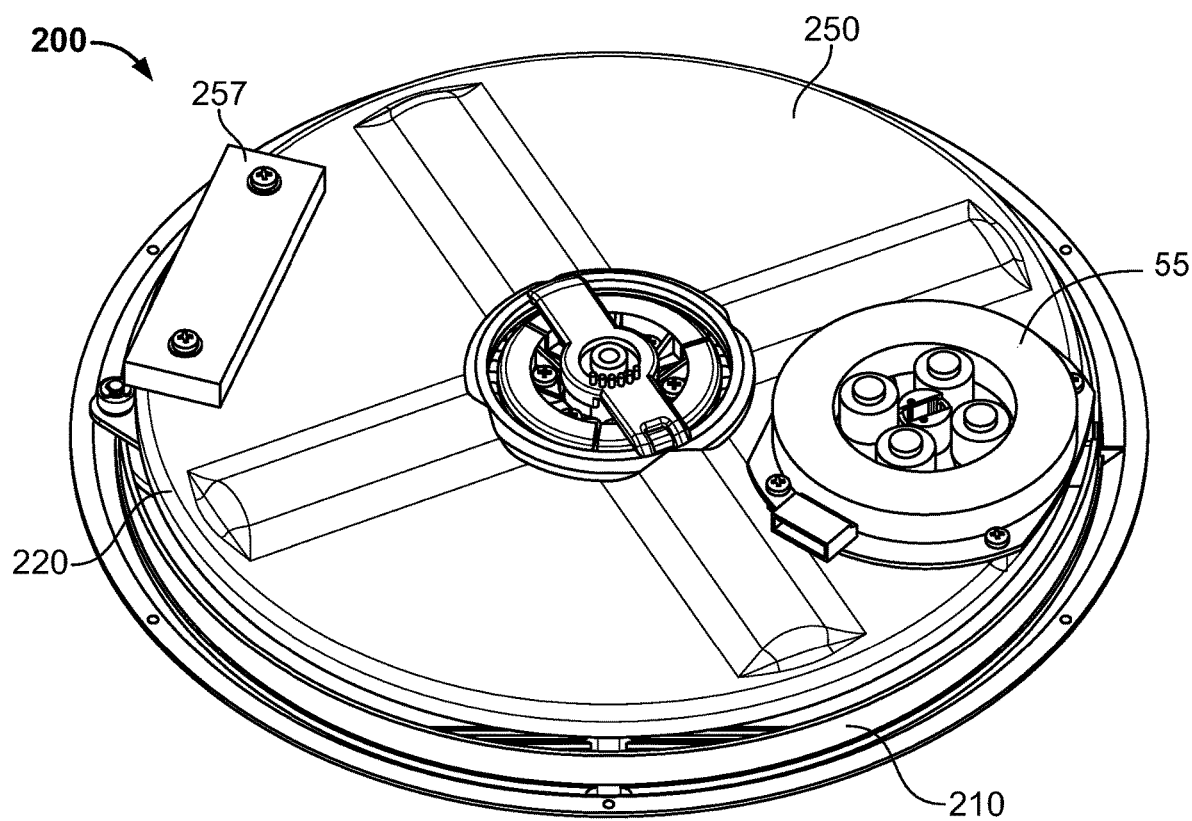
FIG. 5A shows a top perspective view of the disc in accordance with another illustrative embodiment of the magnetic levitation timing device.
Figure 5B:
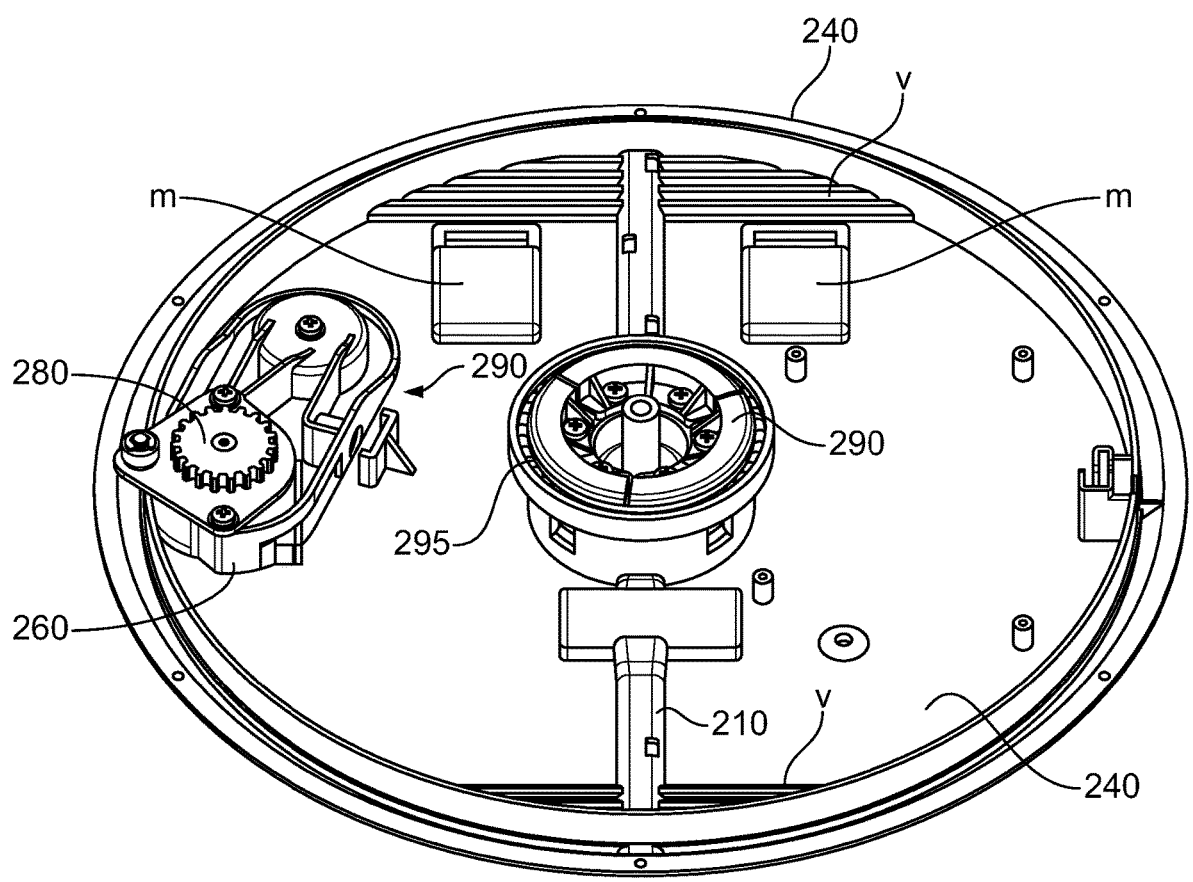
FIG. 5B shows a perspective view of the base in accordance the embodiment shown in FIG. 5A
Figure 5C:
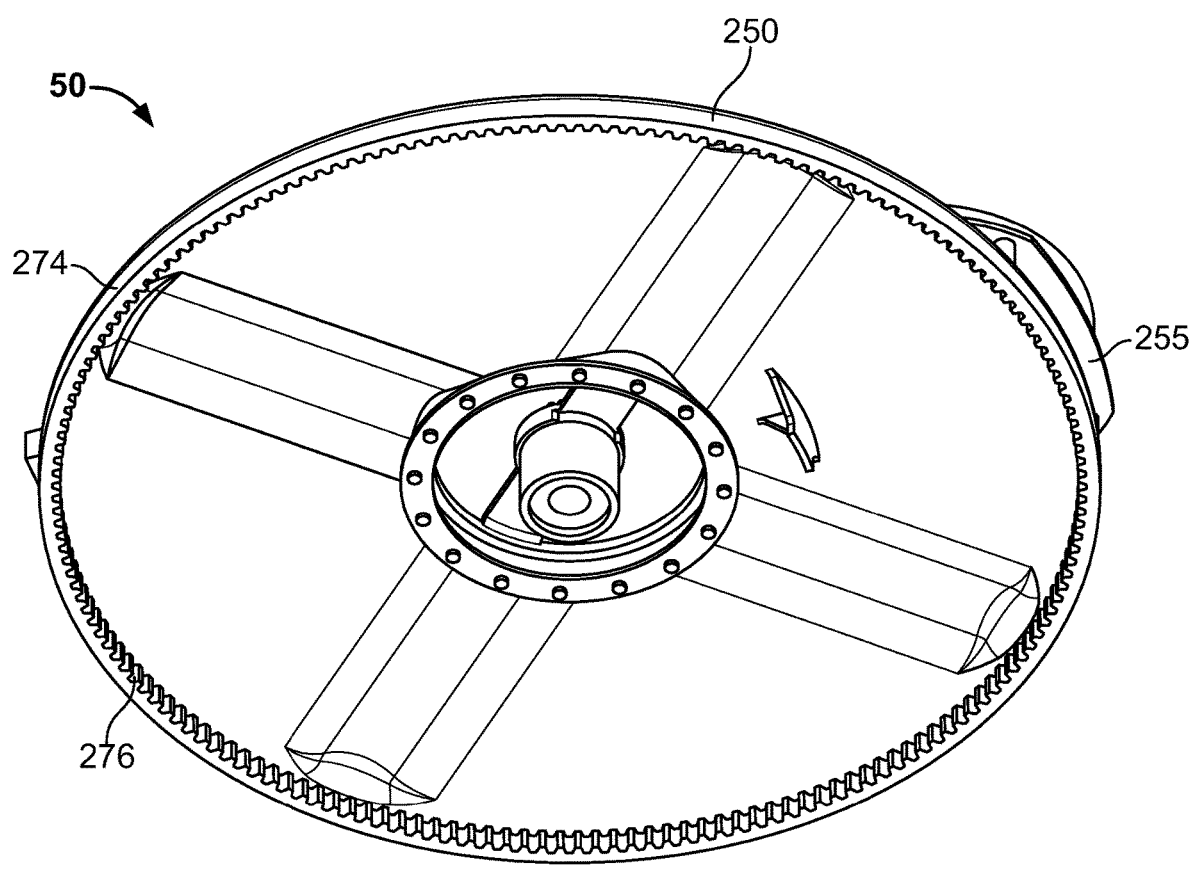
FIG. 5C shows a bottom perspective view of the disc in accordance the embodiment shown in FIG. 5A.

FIGS. 5A, 5B, 5C, and 5D show another example of the magnetic levitation timing device 250 showing a specific embodiment having a magnetic configuration 55 and a counterweight 93. While the counterweight 93 is shown across from the electromagnetic configuration 55, it is feasible to place counterweight 93 at various places on the disc 250. In this example, two sets of gears 220, 280 are used to rotate the rotating disc 250. FIG. 5A shows the electromagnetic configuration 55 connected to or resting upon the disc 250. FIG. 5B also shows a gear system 290 having an outer gear 280 along the base 240, which operatively connects to the rim 276 (shown in FIG. 5C) having a toothed shape or rod along the edge of the disc 250. In this example, there may also be an optional wire groove 110 to hold the wire that may power the motor 100 that drives the gear 280, bearings 295, slip ring 290, vents V, and mounting brackets m on the base 240. FIG. 5C illustrates a toothed shape or rod of rim 274 that can be thought of as a sector gear with an infinitely large radius of curvature of the rotating disc 250. In one example, the outer gear 276 and the inner gear 280 on the base 250 cooperate to more or rotate the disc 250 about the base 240.

Figure 5D:
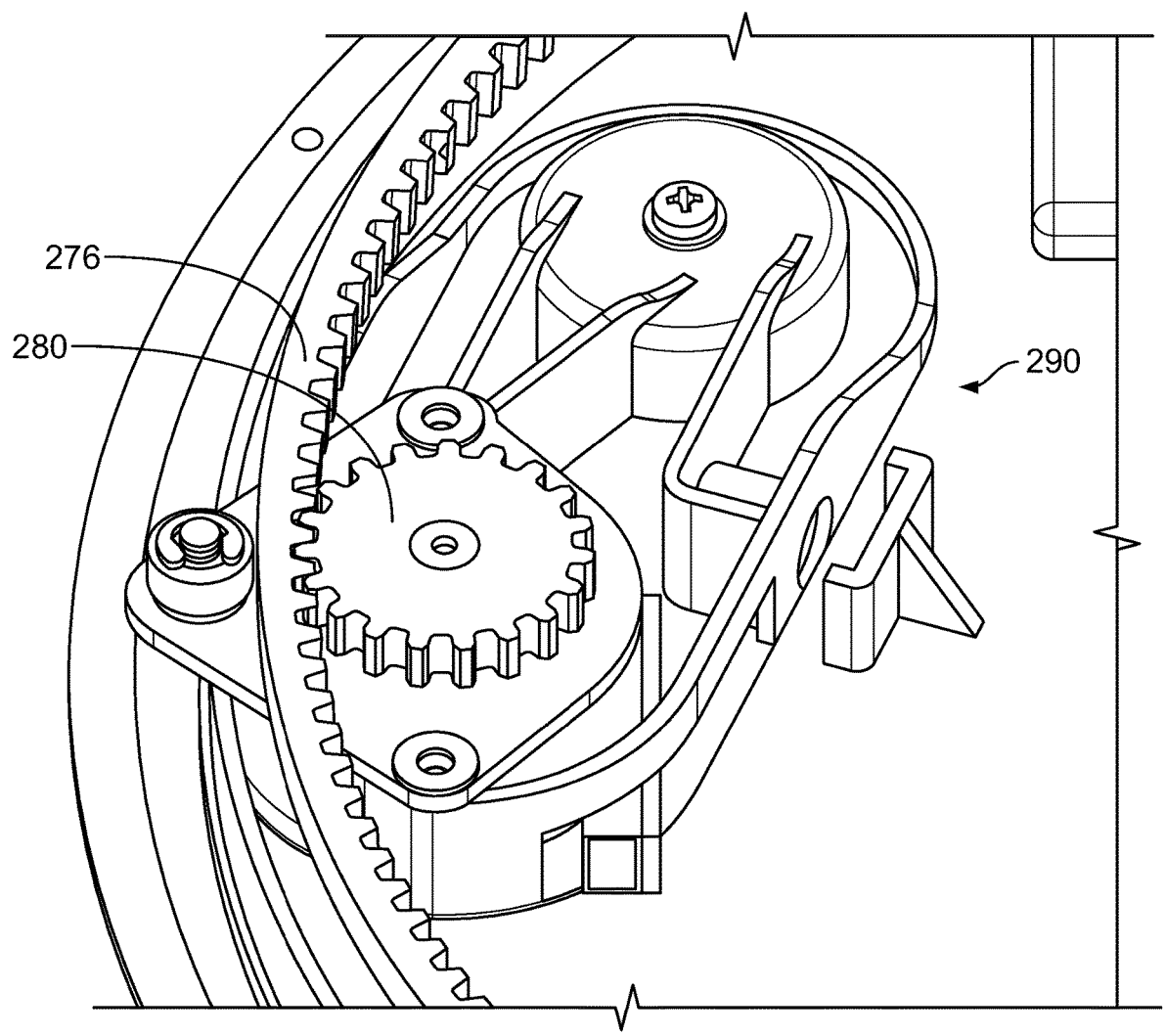
FIG. 5D shows a perspective view of the exemplary rack and pinion gear system in accordance the embodiment shown in FIG. 5A.

FIG. 5D illustrates the rack and pinion arrangement of gear system 290 on disc 250 with the gears 276 and 280, which engages the toothed bar of the rim 276. The engagement of gears 276 and 280 or the pinion system may have slack to facilitate smooth movement.

While the magnetic levitation timing device 10 can have traditional levitation systems and features, FIG. 5A shows another specific embodiment in which the magnetic configuration 55 operatively linked to the marker 20 has a counterweight 93 opposite to or away from it. As shown in FIG. 5B, there can be a counterweight 93 (opposite the levitation marker 20 or levitation object) together with the outer gear 276 stabilizes the rotation of the levitation system and allows a "smoother" rotation of the levitation unit 55 at, e.g., 90 degrees. Again, the counterweight 93 can be adapted to move in opposition to the marker 20 to cancel the accelerating forces in the vertical position. In other embodiments, there may be more than one counterweight 93 placed at positions other than opposite the electromagnetic configuration 55.

Figure 5E:
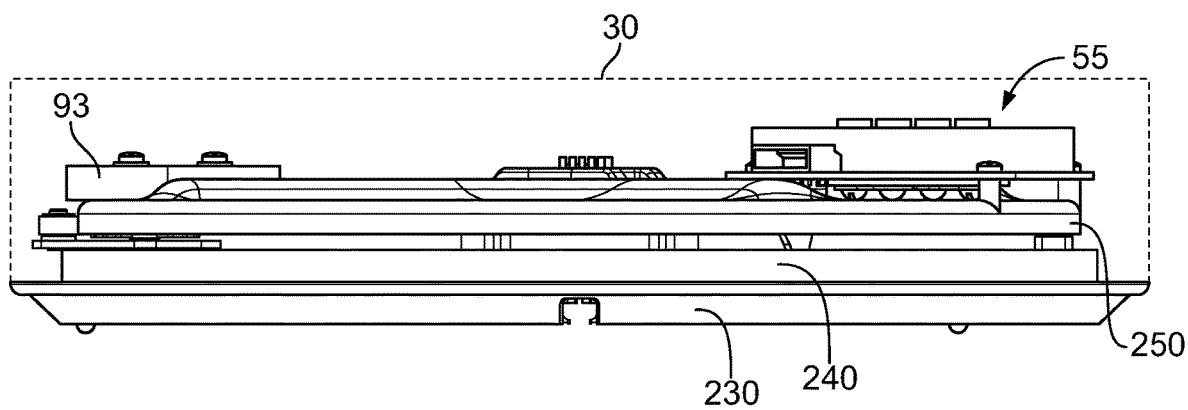
FIG. 5E shows a side view of another embodiment of the magnetic levitation timing device shown in FIG. 5A.

FIG. 5E shows a side view of the embodiment show in FIG. 5A. There can be two sets of gears 61, 62, which are powered by one or more motors 100. The housing 30, such as that shown in FIG. 1, rests over the disc 255 and base 240. The disc 250 cooperates with the base 240 and mounting plate 230 so to engage the gear and pinion system. Mounting plate 230 may have additional features such a lighting system described later herein. The gear system 290 together with the motor rotates the electromagnetic configuration 55.

In one embodiment, the magnetic levitation timing device 10 can incorporate a magnetic field (or levitation forces) provided by the marker 20 oscillated at one or more frequencies. These oscillation or drive frequencies are typically selected to correspond to frequencies of one or more driven or vibrated elements on a supported or magnetically levitated object. The magnetic field or levitating force provided by the electromagnetic force driving configuration 55 and oscillation assembly may be varied using an oscillation signal generator or oscillation driver such as a sinusoidal signal generator feeding an oscillation signal to the levitation driver/actuator controlling the electromagnet or such as an unstable feedback loop for the levitation driver/actuator or via another oscillation means as described herein or as will become apparent based on this description. The electromagnetic configuration can have an oscillation assembly comprising an electromagnet, a levitation driver driving the electromagnet with a control signal to generate a controlled levitating magnetic field. The electromagnetic configuration may be configured with adjustments to compensate for permanent non-equilibrium.

The electromagnetic configuration or assembly can be powered or driven with a control signal that is maintained via a stable feedback loop to provide a suspending magnetic field or levitating force to float or suspend the marker 20 at a fixed distance and position relative to the electromagnet. The feedback loop may include one or more position sensors (such as a Hall Effect sensor) to sense the distance between the levitated marker 20 and either the electromagnet itself or a separate magnet (e.g., a magnet) placed at the bottom or base of the levitated marker 20.

Figure 6:
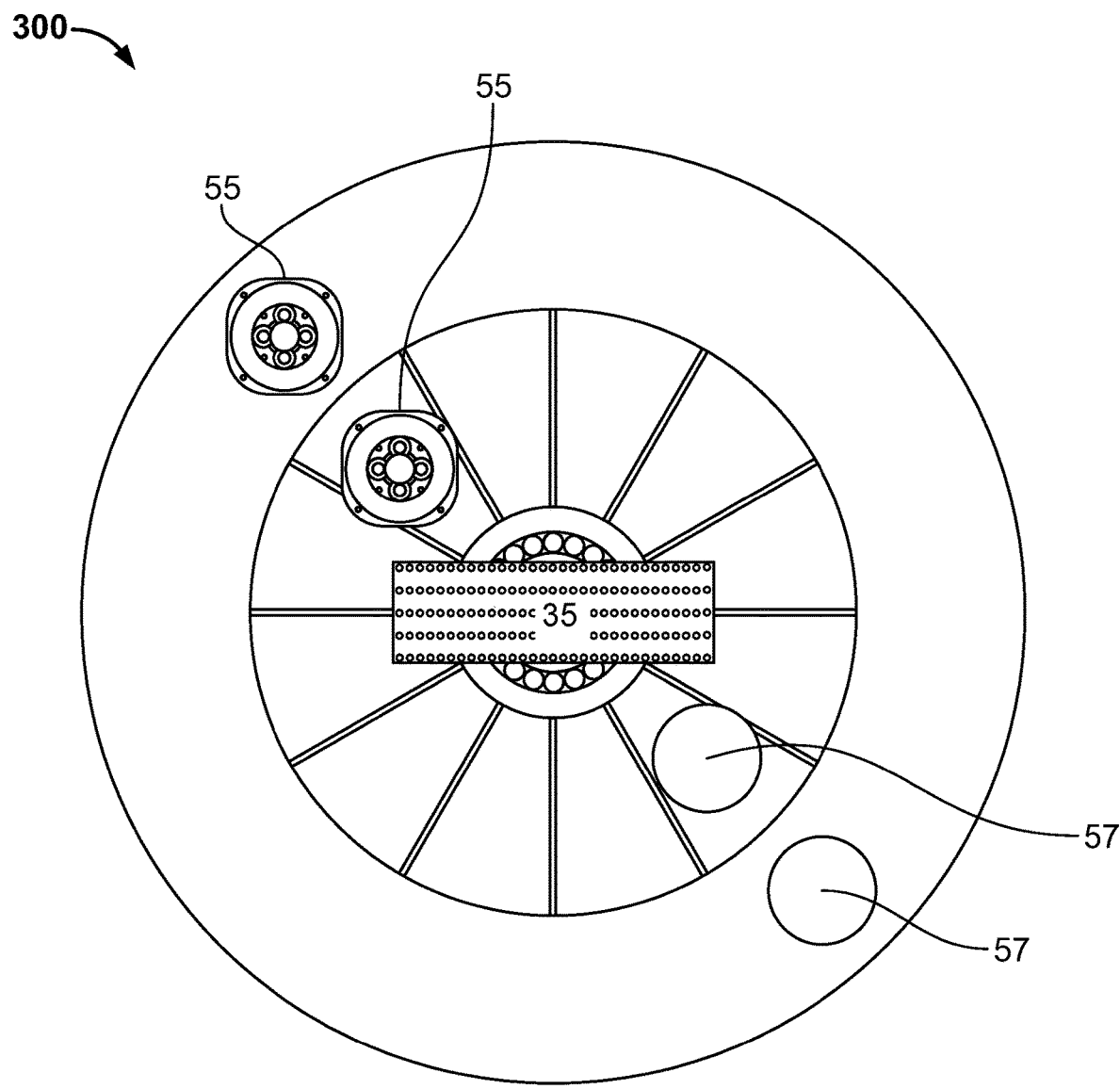
FIG. 6 is a top view of another embodiment of the magnetic levitation timing device.

FIG. 6 shows another embodiment of the magnetic levitation device 300 having multiple markers 20. In this embodiment, each of the markers 20 has an independent disc and gear arrangement. The markers 20 may move independent from each other. This arrangement may be useful, e.g., to create a clock with an hour marker and a minute marker. There may be additional markers, which may increase the size and cost of the device 300.

Figure 7:
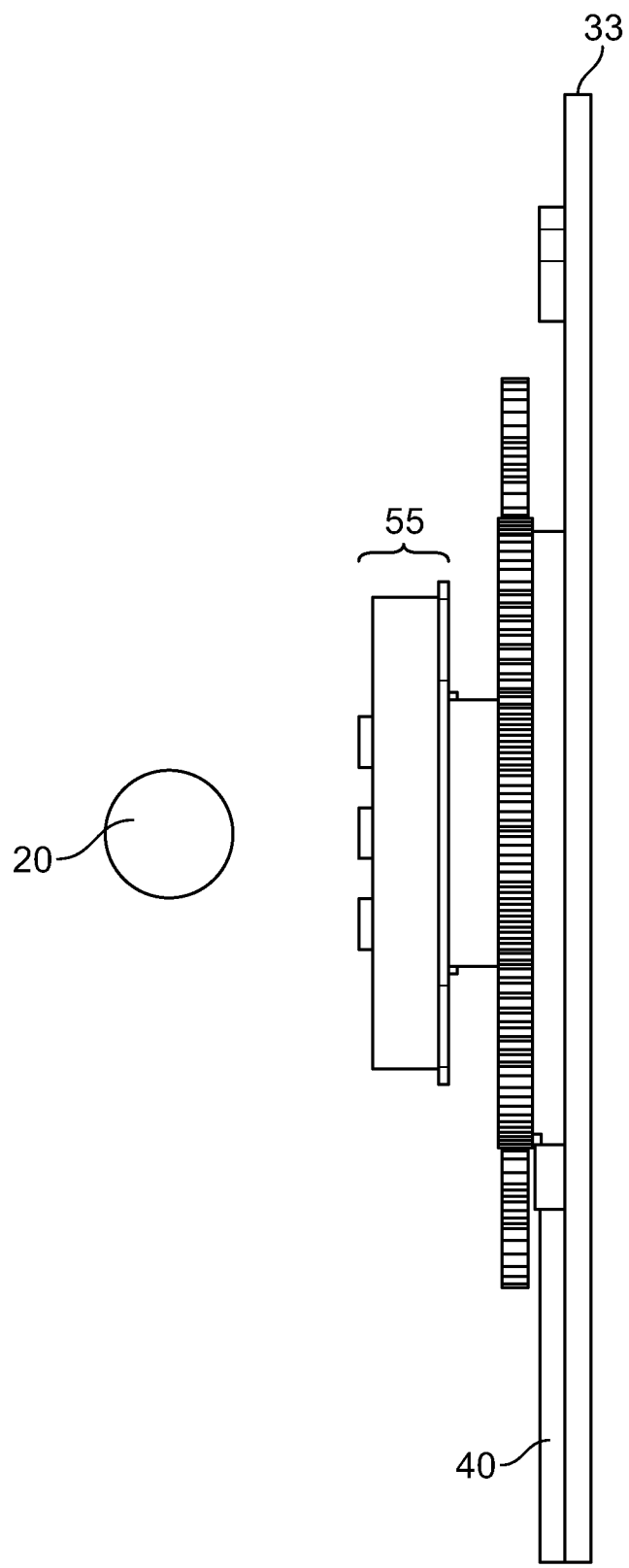
FIG. 7 is a side view of another embodiment of the magnetic levitation timing device.

FIG. 7 shows another embodiment of the magnetic levitation device 400 having multiple markers 20 on a single disc and gear arrangement. In this arrangement, one of the markers 20 is held in the center in place by an electromagnetic configuration and does not move. Another or other markers 20 (now shown here) can be included using the mechanism described herein and shown (e.g., in FIG. 1).

Figure 8:
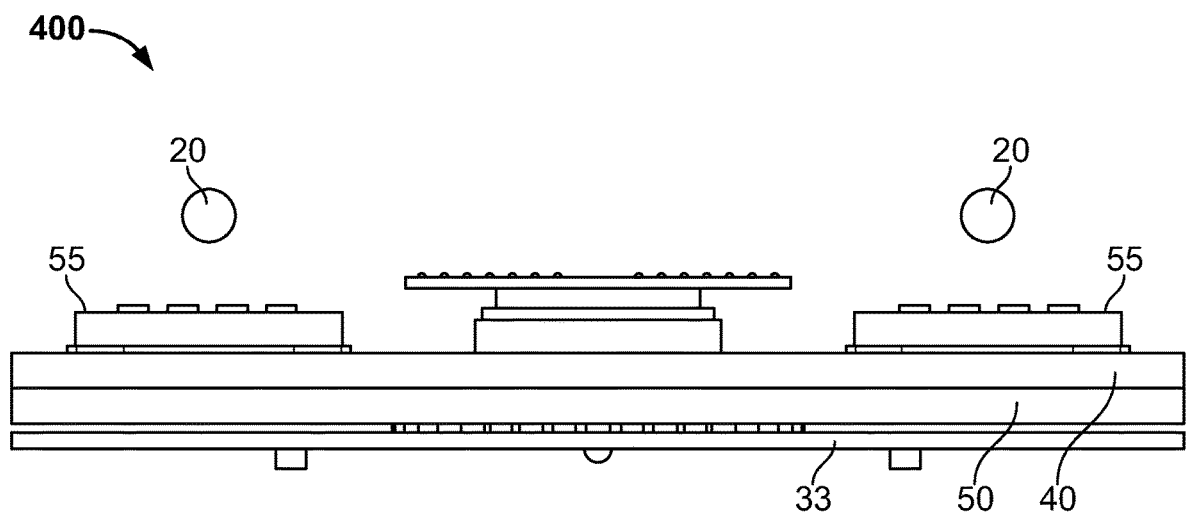
FIG. 8 is a top view of another embodiment of the magnetic levitation timing device.

FIG. 8 shows another embodiment of the magnetic levitation device 400 having multiple markers 20 on a single disc and gear arrangement. In this arrangement, the markers 20 are each held using a single electromagnetic configuration 55. Each electromagnetic configuration 55 is rests on disc 50, which connects to base 40.

Figure 9A:
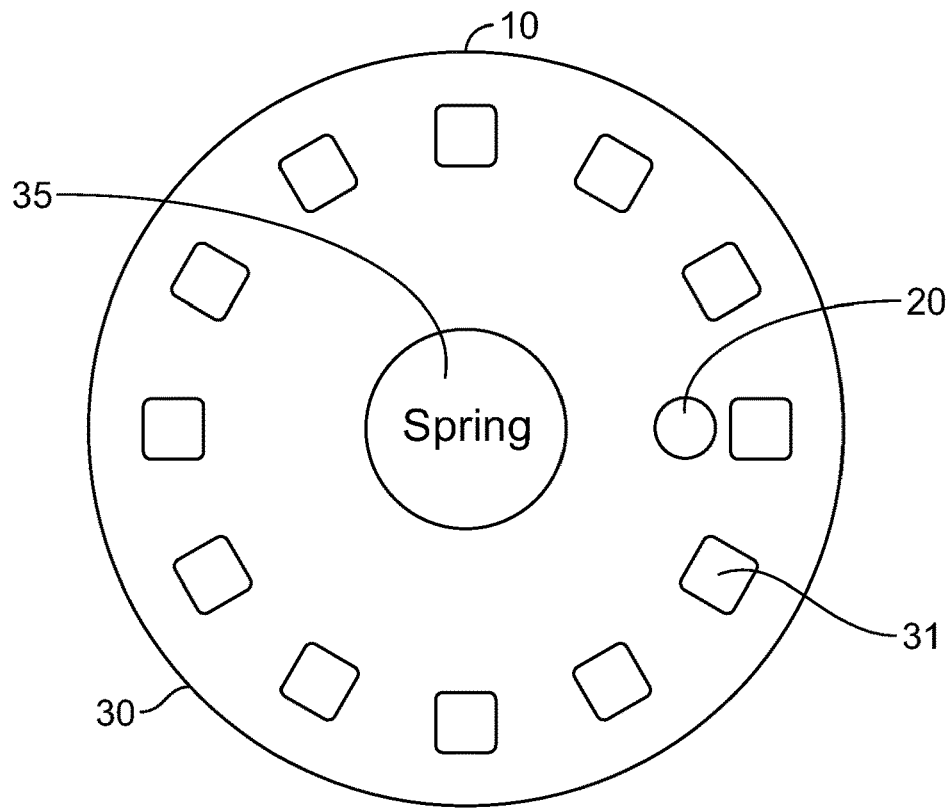
FIG. 9A is a top view of exemplary displays that may be using in connection with one or more embodiments.
Figure 9B:
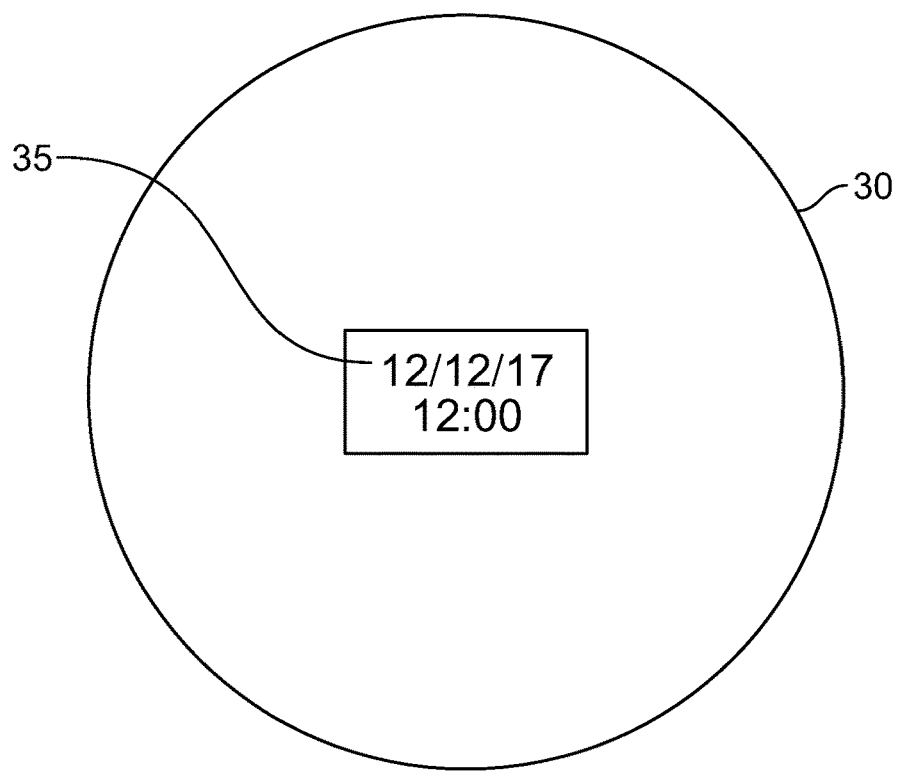
FIG. 9B is a top view of exemplary displays that may be used in connection with one or more of embodiment.

As shown in FIGS. 9A and 9B, the magnetic levitation timing device 10 can provide tracking of events for a user. For example, a magnetic levitation timing device 10 signals (e.g., on a smart device) the user directly at the time of a scheduled event and visually demonstrates the passage of time during a scheduled event. The magnetic levitation timing device 10 can be interactive in that markers on the bottom of the lower portion 40 of the event clock correspond to changing schedules. In one example, the base of the device may be light up in one or more portions to convey information and events to a user. Further, this light up arrangements may express the information of an event or enhance the mood of the viewers. In FIG. 9A, the display 35 indicates the season of the year; while in FIG. 9B, display 35 indicates a time and date.

In operation, the magnetic levitation timing device 10 may work as follows. The timing mechanism moves the marker 20 at a constant or variable speed about or around the face of magnetic levitation timing device 10. A battery or a direct current provides power to the timing mechanism in the "on" position. Optionally, the magnetic levitation timing device 10 can be provided with the ON/OFF switch. Further, when pressing the ON switch, a screen may appear on the display 35. The display 35 may show the current time, to see whether the time reaches the pre-set time; to reach the pre-set given time the event is activated and subsequently the marker 20 starts to float.

In another embodiment, the indicia 31 can move along a linear, rather than circular path on the surface of the magnetic levitation timing device 10. In some embodiments, the indicia 31 may be luminescent. For example, the indicia 31 can illuminate around or along the outer portion 30.

In some embodiments, the magnetic levitation timing device 10 is desired to depict events over a nonstandard period of time. In other embodiments, the magnetic levitation timing device may be desired to depict standard time, including, but not limited to, minutes, hours, seconds, days, etc.

In some embodiments, the magnetic levitation timing device 10 may include non-magnetic or levitating features. For example, the magnetic levitation timing device 10 may have a digital display or another feature that is not magnetically driven.

Figure 10:
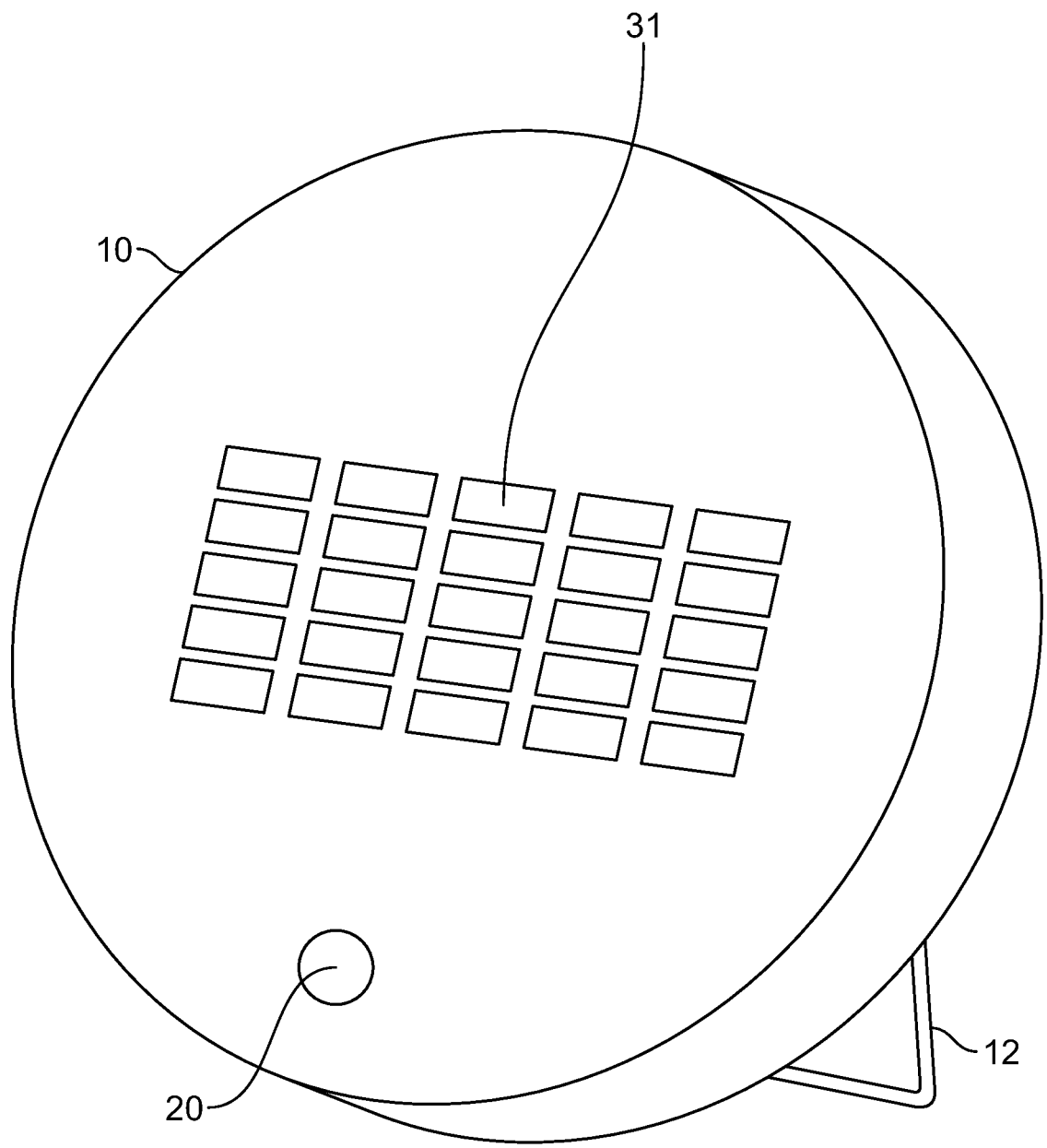
FIG. 10 is a perspective view of a magnetic levitation timing device in accordance with another embodiment.

In some embodiments, the device 10 can be at an angle between 0 degrees and 90 degrees from the center. In such an arrangement, the marker 20 is held and moved by the magnetic forces. FIG. 10 shows an example of device 10 where the angle of the device at about 60 degrees from the horizontal. In this example, device 10 is held up by stand 12, and the marker 20 moves about the housing 30 with indicia 31.

Figure 11:
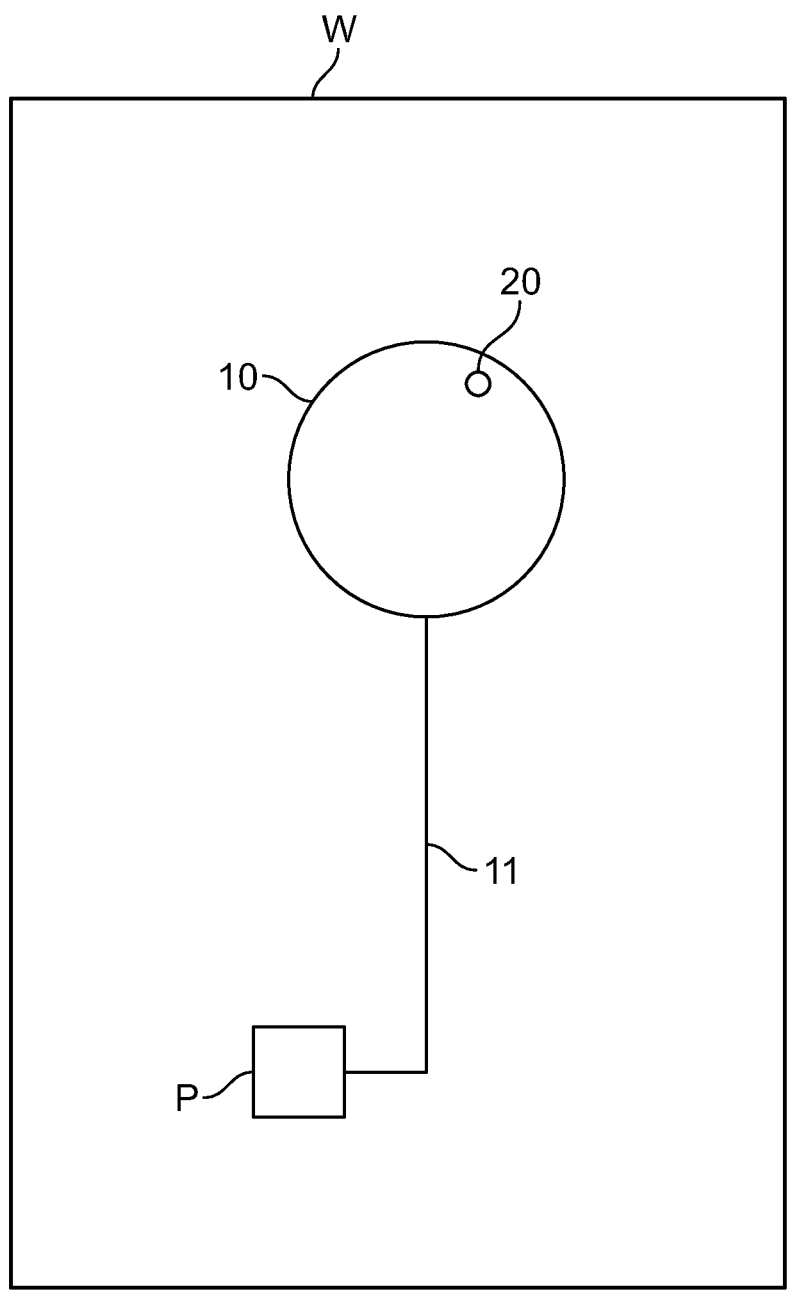
FIG. 11 shows an embodiment of the magnetic levitation timing device on a vertical surface (e.g., a wall).

In an exemplary use and application shown in FIG. 11, the magnetic levitation device 10 may be place on a wall W or other type of vertical/non-flat surface. In this arrangement, the device 10 can be operatively connected to a power outlet P by for example a cord 11. The marker 20 is suspended away from the device 10 and may move or rotate.

Further in another embodiment, a control unit includes a microcontroller, power module, touch screen module, time module and Bluetooth® module/Wi-Fi module. The power module, touch screen module, time module, and Bluetooth® module/Wi-Fi module are electrically connected to the microcontroller, where the touch screen module uses a resistive touch screen that supports a variety of configuration controls.

In another embodiment, the base may be illuminated from the back side or from the sides of the housing. In this arrangement, the device 10 can have the appearance of a lunar eclipse.

In some embodiments, the marker may be luminescent through power delivered from the electromagnetic configuration. For example, a transmitting coil can transmit power to the marker, which may allow the marker to illuminate. The marker can illuminate around or along the upper surface.

Referring to FIGS. 1 through 12, in one embodiment the device 10 is wirelessly connected over a network to a remote device for analysis and feedback. The remote device may include, but is not limited to, a computer, or a tablet or a smart phone. The user may download an application (e.g., program/software) on the remote device. Examples of the application may include, timing app or event app (iOS, Windows or Android). The network may be any suitable networks or links, including, but not limited to, a local area network (LAN), wide area network (WAN), Internet, an intranet or any wireless communication links. In an embodiment, wireless data links are established as Bluetooth® communication links between the device 10 and the remote device having Bluetooth® capabilities. In some embodiments, the device 10 utilizes Bluetooth® Smart devices or other Bluetooth® Low Energy (BLE) devices having Bluetooth® transceivers. A Bluetooth® wireless communication link can allow real-time data communications between the device 10 and the remote device. In an embodiment, the magnetic levitation timing device 10 is operatively connected to a remote device (e.g., IPhone®, IPad®, Android®) and the cloud. In such an arrangement, data can be projected and conveyed to the remote device 10 and further, the device 10 may be synced with an application on the remote device. Further, the marker 20 and the electromagnetic configuration 55 may controlled by or through a wireless device or server.

The magnetic levitation timing device is capable of other embodiments and of being practiced or carried out in various ways, without departing from the spirit and scope of this application. In another embodiment, the back of the housing or some of the house may have a light or be backlit.

A typical electromagnetic configuration or levitation unit that can be used with certain embodiments in known in the art. The electromagnet is powered or driven with a control signal that is maintained via a stable feedback loop to provide a suspending magnetic field or levitating force to float the object at a fixed distance and position relative to the electromagnet. The feedback loop may include a position sensor (such as a Hall effect sensor) to sense the distance between the levitated object and either the electromagnet itself or a separate magnet (e.g., a magnet placed at the bottom or base of the levitated object).

Certain features of the embodiments of the claimed subject matter have been illustrated as described herein; however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

What is claimed is:

1. A magnetic levitation timing device for levitating a marker or suspending the marker away from the device, comprising:
    a housing having an outer portion and a lower portion, wherein the housing is at an angle greater than 10 degrees from a horizontal;
    an electromagnetic configuration that suspends or levitates marker the marker so that the marker can move or rotate at a constant or variable speed on, about or around the outer portion of the housing, wherein the electromagnetic configuration has an oscillation assembly comprising an electromagnet, and a levitation driver capable of driving the electromagnet with a control signal to generate a controlled levitating magnetic field;
    a counterweight away from the electromagnetic configuration; a rotating disc configured with the electromagnetic configuration, wherein the electromagnetic configuration rests on the disc and the counterweight rests on the disc; and
    a gear assembly configured with a motor and the rotating disc to move or rotate the electromagnetic configuration.

2. The device of claim 1, wherein the marker has a permanent magnet.

3. The device of claim 1, wherein the counterweight is about the same weight as the electromagnetic configuration.

4. The device of claim 1, wherein the electromagnet has a coil array, and the electromagnetic configuration has automatic compensation for permanent non-equilibrium in order to suppress average consumption of the coils.

5. The device of claim 1, wherein the housing has an outer portion, and the outer portion has an interactive display.

6. The device of claim 1, wherein the device visually reveals a time for a predetermined event.

7. The device of claim 6, further comprising an interactive display.

8. The device of claim 6, further comprising a control unit having a microcontroller, power modules, touch screen modules, time modules and Bluetooth module/Wi-Fi module.

9. The device of claim 6, the marker is disposed in relation to the indicia such that the indicia together with the marker signals the scheduled time that the particular event is to occur.

10. The device of claim 1, wherein the rotating disc is configured with the rotating assembly; and the rotating assembly includes a motor with a gear mounted on another gear arranged in a motor housing on the rotating disc.

11. The device of claim 1, further comprising a Bluetooth link to a smart device, wherein the speed or position of the marker may be controlled by the smart device.

12. A magnetic levitation timing device for levitating a marker or suspending the marker away from the device, comprising: a housing having an outer portion and a lower portion, wherein the housing is at an angle greater than 10 degrees from a horizontal; an electromagnetic configuration that suspends or levitates marker the marker so that the marker can move or rotate at a constant or variable speed on, about or around the outer portion of the housing, wherein the electromagnetic configuration has an oscillation assembly comprising an electromagnet, and a levitation driver capable of driving the electromagnet with a control signal to generate a controlled levitating magnetic field; a counterweight away from the electromagnetic configuration; a rotating disc configured with the electromagnetic configuration, wherein the electromagnetic configuration rests on the disc and the counterweight rests on the disc, the counterweight is on the disc so to stabilize the movement of the electromagnetic configuration while the device is at an angle with respect to the horizontal, wherein the rotating disc is configured with the rotating assembly; and the rotating assembly includes a motor with a gear mounted on another gear arranged in a motor housing on the rotating disc; and a gear assembly configured with a motor to move or rotate the electromagnetic configuration, wherein the housing has a lower surface and the lower surface is configured to secure the device such that the marker is held or suspended.

\* \* \* \* \*